(12) United States Patent
Ono et al.

(10) Patent No.: US 9,600,054 B2
(45) Date of Patent: *Mar. 21, 2017

(54) SYSTEM AND METHOD FOR PERFORMING POWER STATE TRANSITIONS BY UTILIZING A GROUP OF SENSORS EACH WITH A CORRESPONDING SENSING DISTANCE TO SENSE PRESENCE OF A PERSON

(71) Applicant: FUJI XEROX CO., LTD., Tokyo (JP)

(72) Inventors: Masafumi Ono, Kanagawa (JP);
Manabu Hayashi, Kanagawa (JP);
Naoya Nobutani, Kanagawa (JP);
Shigeki Katayama, Kanagawa (JP);
Yuki Noguchi, Kanagawa (JP)

(73) Assignee: FUJI XEROX CO., LTD., Tokyo (JP)

( * ) Notice: Subject to any disclaimer, the term of this patent is extended or adjusted under 35 U.S.C. 154(b) by 354 days.

This patent is subject to a terminal disclaimer.

(21) Appl. No.: 14/106,127

(22) Filed: Dec. 13, 2013

(65) Prior Publication Data

US 2015/0006927 A1 Jan. 1, 2015

(30) Foreign Application Priority Data

Jun. 28, 2013 (JP) .................................. 2013-136812

(51) Int. Cl.
*G06F 1/26* (2006.01)
*G06F 1/32* (2006.01)
*H04N 1/00* (2006.01)

(52) U.S. Cl.
CPC .......... *G06F 1/3231* (2013.01); *G06F 1/3234* (2013.01); *G06F 1/3284* (2013.01);
(Continued)

(58) Field of Classification Search
CPC .... G06F 1/3231; G06F 1/3234; G06F 1/3203; G06F 1/3284; H04N 1/00896;
(Continued)

(56) References Cited

U.S. PATENT DOCUMENTS

2007/0240002 A1* 10/2007 Motoyama ............ G06F 1/3209
713/320
2009/0316954 A1* 12/2009 Kohara .............. G03G 15/5016
382/103
(Continued)

FOREIGN PATENT DOCUMENTS

JP A-5-45471 2/1993
JP 2007321440 A * 12/2007
(Continued)

OTHER PUBLICATIONS

Aug. 2, 2016 Office Action issued in Japanese Patent Application No. 2013-136812.

*Primary Examiner* — Thomas Lee
*Assistant Examiner* — Zhipeng Wang
(74) *Attorney, Agent, or Firm* — Oliff PLC

(57) ABSTRACT

An information processing apparatus includes a first sensor unit that senses a person within a first distance from the information processing apparatus, a second sensor unit that senses a person within a second distance set closer to the information processing apparatus than the first distance, a shifting unit that sets the information processing apparatus to a first mode when a person is sensed by the first sensor unit, and shifts the information processing apparatus from the first mode to a second mode that consumes power less than in the first mode when the person is no longer sensed within the second distance by the second sensor unit, a receiving unit that receives an instruction to modify the first distance or the second distance, and a modifying unit that
(Continued)

modifies the first distance or the second distance in response to the instruction received by the receiving unit.

15 Claims, 12 Drawing Sheets

(52) U.S. Cl.
CPC ..... *H04N 1/00891* (2013.01); *H04N 1/00896* (2013.01); *H04N 2201/0094* (2013.01); *Y02B 60/1271* (2013.01); *Y02B 60/1289* (2013.01)

(58) Field of Classification Search
CPC ....... H04N 1/00891; H04N 2201/0094; Y02B 60/1289; Y02B 60/1267
See application file for complete search history.

(56) References Cited

U.S. PATENT DOCUMENTS

| | | | |
|---|---|---|---|
| 2010/0150600 A1* | 6/2010 | Oyoshi | G03G 15/5004 399/88 |
| 2010/0231390 A1* | 9/2010 | Hashimoto | G03G 15/5004 340/573.1 |
| 2011/0109937 A1* | 5/2011 | Fujiki | H04N 1/00885 358/1.15 |
| 2011/0296163 A1* | 12/2011 | Abernethy | G06F 1/3203 713/100 |
| 2012/0127518 A1* | 5/2012 | Ogata | G06F 1/3231 358/1.15 |
| 2012/0254967 A1* | 10/2012 | Braun | G06F 21/32 726/7 |
| 2012/0327458 A1 | 12/2012 | Baba et al. | |
| 2013/0073887 A1 | 3/2013 | Miki et al. | |
| 2013/0128298 A1* | 5/2013 | Yamada | G06K 15/02 358/1.13 |
| 2013/0135196 A1* | 5/2013 | Park | G06F 3/01 345/156 |
| 2013/0222611 A1* | 8/2013 | Hsu | G06F 1/3231 348/207.1 |

FOREIGN PATENT DOCUMENTS

| | | | |
|---|---|---|---|
| JP | 2010174565 A | * | 8/2010 |
| JP | A-2012-114500 | | 6/2012 |
| JP | A-2012-142778 | | 7/2012 |
| JP | A-2012-256234 | | 12/2012 |
| JP | 2013-033191 A | | 2/2013 |
| JP | 2013-065974 A | | 4/2013 |

* cited by examiner

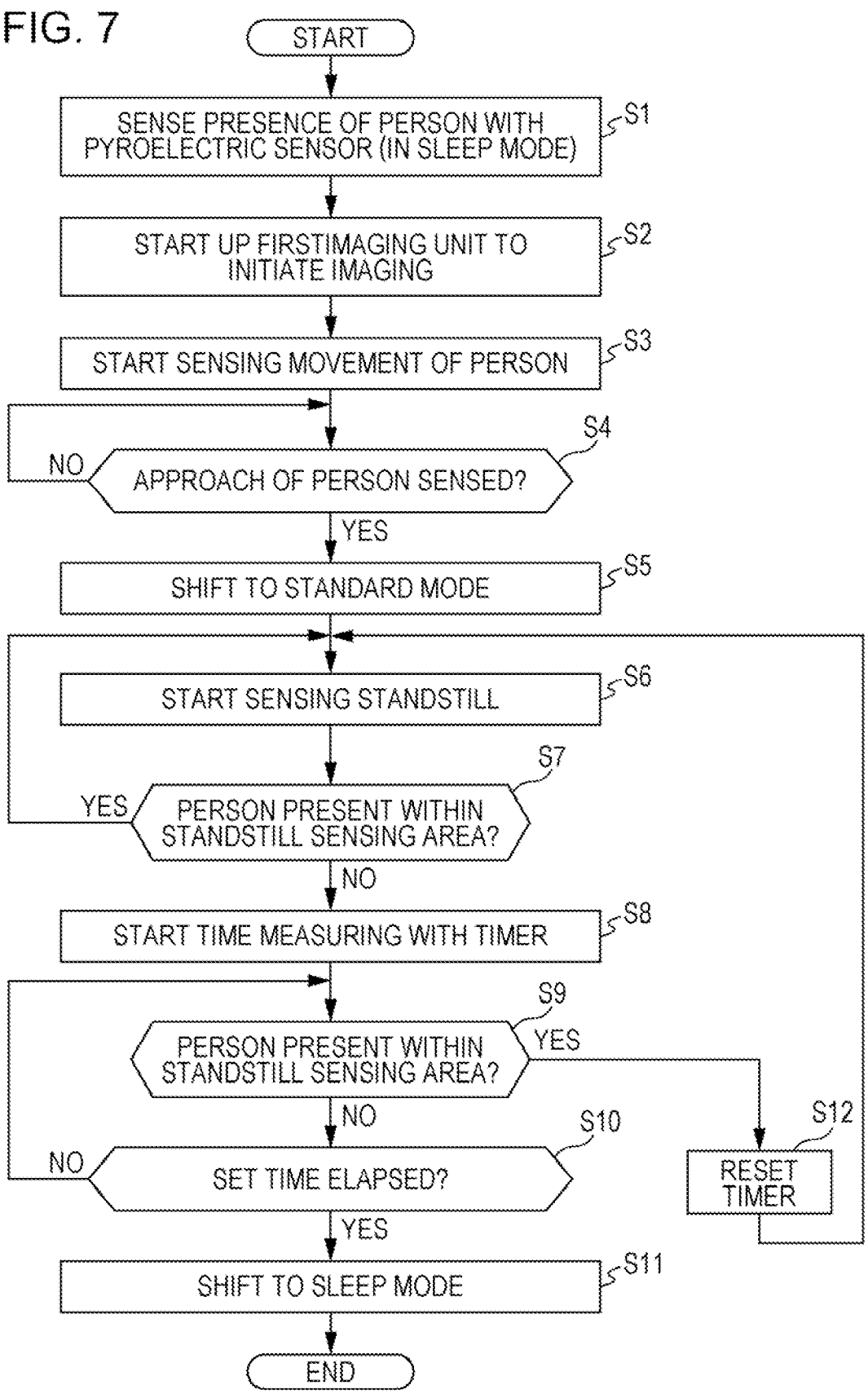

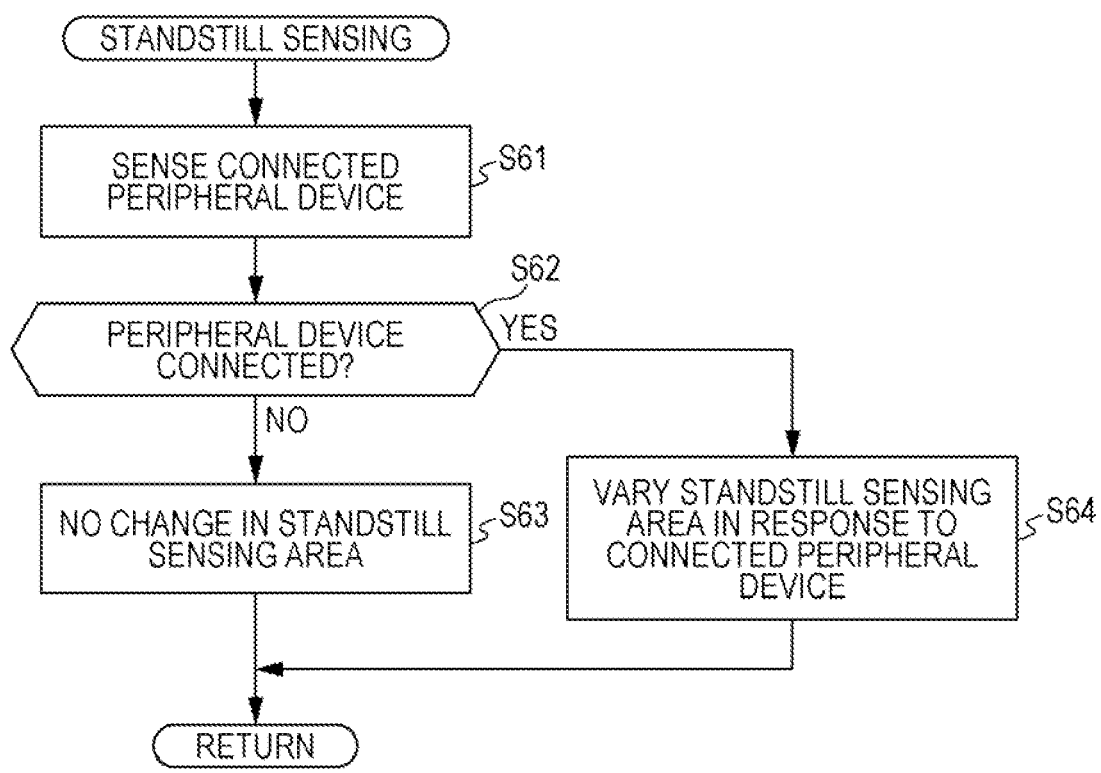

SYSTEM AND METHOD FOR PERFORMING POWER STATE TRANSITIONS BY UTILIZING A GROUP OF SENSORS EACH WITH A CORRESPONDING SENSING DISTANCE TO SENSE PRESENCE OF A PERSON

CROSS-REFERENCE TO RELATED APPLICATIONS

This application is based on and claims priority under 35 USC 119 from Japanese Patent Application No. 2013-136812 filed Jun. 28, 2013.

BACKGROUND

Technical Field

The present invention relates to an information processing apparatus, an information processing method and a non-transitory computer readable medium.

SUMMARY

According to an aspect of the invention, there is provided an information processing apparatus. The information processing apparatus includes a first sensor unit that senses a person within a first distance from the information processing apparatus, a second sensor unit that senses a person within a second distance set closer to the information processing apparatus than the first distance, a shifting unit that sets the information processing apparatus to a first mode when a person is sensed by the first sensor unit, and shifts the information processing apparatus from the first mode to a second mode that consumes power less than in the first mode when the person is no longer sensed within the second distance by the second sensor unit, a receiving unit that receives an instruction to modify the first distance or the second distance, and a modifying unit that modifies the first distance or the second distance in response to the instruction received by the receiving unit.

BRIEF DESCRIPTION OF THE DRAWINGS

Exemplary embodiments of the present invention will be described in detail based on the following figures, wherein:

FIG. 7 is a flowchart illustrating a process to control the mode of the image forming apparatus;

FIG. 10 is a flowchart illustrating a process of setting a standstill sensing area of the image forming apparatus;

DETAILED DESCRIPTION

Exemplary embodiments of the present invention are described with reference to the drawings. An information processing apparatus of the exemplary embodiments is applied to an image forming apparatus.

Figure 1:
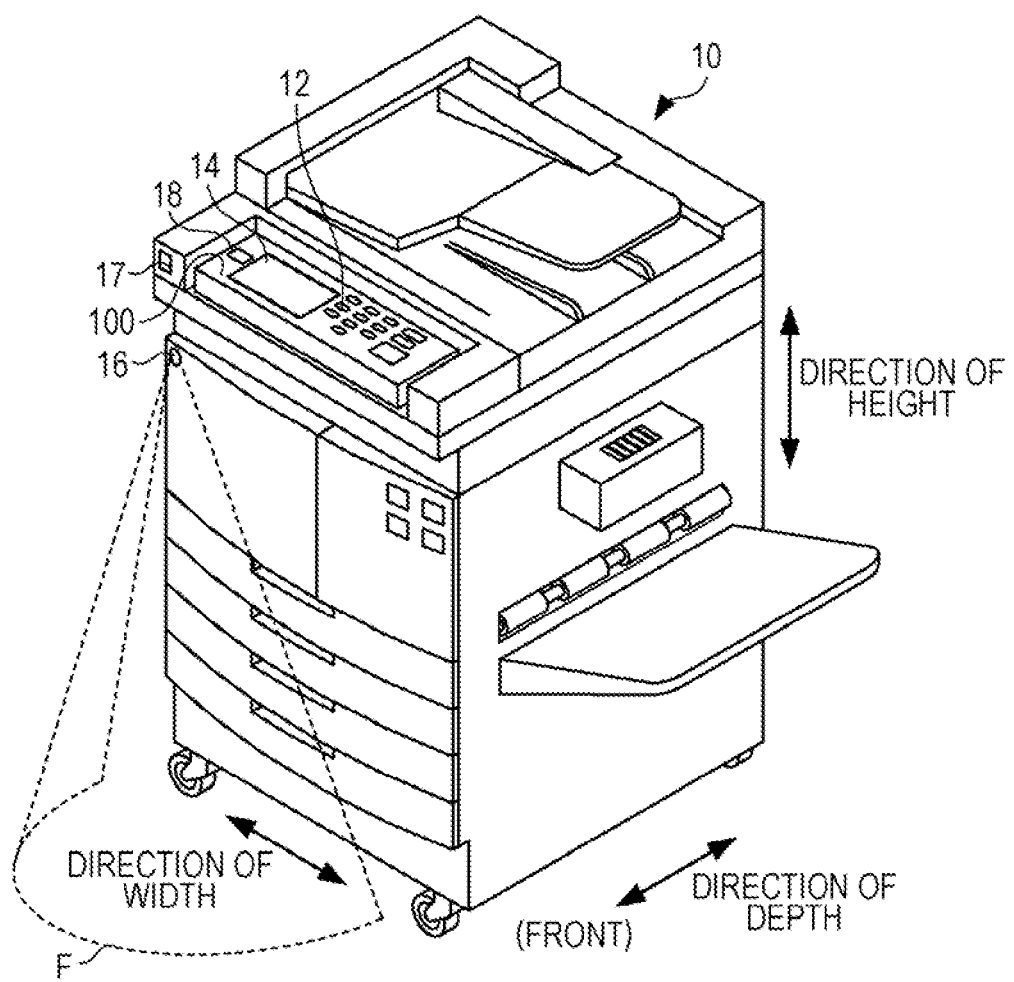
FIG. 1 is a perspective external view illustrating an image forming apparatus of an exemplary embodiment of the present invention.

FIG. 1 is a perspective external view illustrating the image forming apparatus 10 of an exemplary embodiment of the present invention. As illustrated in FIG. 1, the image forming apparatus 10 is of a console type, and performs information processing including a scan process, a copy process, and a facsimile transmission process. A person who uses the image forming apparatus 10 (namely, a user) may stand in front of the image forming apparatus 10 and operates an operation panel 100. The operation panel 100 is arranged on a top front position of the image forming apparatus 10. The operation panel 100 includes an operation unit 12, a display 14, and a second imaging unit 18. In order to sense the presence of a person present in front of the image forming apparatus 10, the image forming apparatus 10 further includes a pyroelectric sensor 16 and a first imaging unit 17. A sensing area F of FIG. 1 is an area where the pyroelectric sensor 16 may sense the presence of a person. The first imaging unit 17 is arranged higher than the pyroelectric sensor 16 in the direction of height of the image forming apparatus 10.

The image forming apparatus 10 operates in one of a standard mode and a sleep mode, different from each other in terms of power consumption. The standard mode is a first mode in which the image forming apparatus 10 performs the information processing in response to an operation performed by the user. In the standard mode, each element of the image forming apparatus 10 is supplied with power to be used to execute the information processing. The sleep mode is a second mode in which at least part of the operation of the image forming apparatus 10 is temporarily suspended. In the sleep mode, power supplying to at least part of the image forming apparatus 10 is suspended. The image forming apparatus 10 consumes power less than in the standard mode. When the image forming apparatus 10 operates in the sleep mode, the controller 11, the pyroelectric sensor 16, and the first imaging unit 17 are supplied with power so that each of these elements remains operative in the sleep mode.

Figure 2:
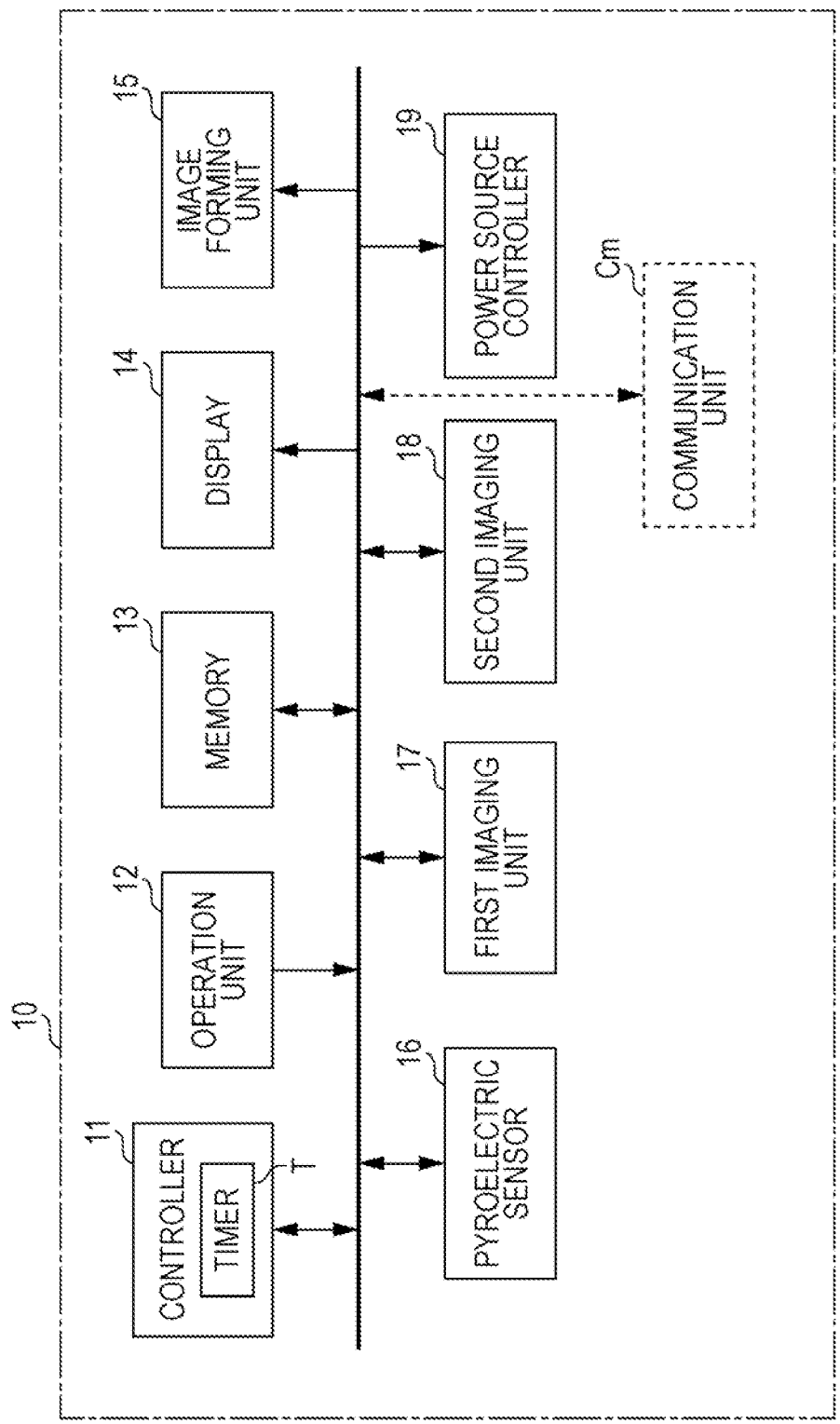
FIG. 2 is a block diagram illustrating the hardware configuration of the image forming apparatus.

FIG. 2 is a block diagram illustrating the hardware configuration of the image forming apparatus 10. As illustrated in FIG. 2, the image forming apparatus 10 includes controller 11, operation unit 12, memory 13, display 14, image forming unit 15, pyroelectric sensor 16, first imaging unit 17, second imaging unit 18, and power source controller 19.

The controller 11 includes a processor that includes a central processing unit (CPU), a read-only memory (ROM), and a random-access memory (RAM). The CPU controls each of the elements of the image forming apparatus 10 by reading a program stored on the ROM or the memory 13 onto the RAM, and executing the program. The controller 11 further includes an image processing unit such as an application specific integrated circuit (ASIC). The image processing unit controls the image processing including image analysis on the image forming apparatus 10. The controller 11 further includes a timer T as a time measuring unit to measure time.

The operation unit 12 includes multiple controls and is arranged on a front portion of a top board of the housing of the image forming apparatus 10. Controls of the operation unit 12 include an operation button that, when pressed, outputs to the controller 11 a signal indicating an instruction, and a touchpanel that senses a location which a pointer such as a finger of a user touches and outputs to the controller 11 a signal corresponding to coordinates of the sensed location. The operation unit 12 receives an operation performed thereon by the user, and then supplies an operation signal responsive to the received operation to the controller 11. The memory 13 includes a hard disk device, for example, and stores a control program to be executed by the controller 11. The display 14 includes a liquid-crystal display, for example, and is arranged on a top front portion of the top board of the housing of the image forming apparatus 10. The liquid crystal display is arranged next to the operation button on the operation unit 12 in the direction of width of the image forming apparatus 10. The touchpanel of the operation unit 12 is overlaid on the liquid crystal display. The touchpanel of the operation unit 12 thus identifies a location that the pointer touches on the liquid crystal display of the display 14. The display 14 is a display device that displays an image (screen) thereon. The image forming unit 15 is a printer that forms an image on a sheet through an electrophotographic process, for example.

The pyroelectric sensor 16 includes a pyroelectric element that senses a quantity of infrared light within the sensing area F, and supplies the sensing result of the quantity of infrared light to the controller 11. Each of the first imaging unit 17 and the second imaging unit 18 includes an imaging lens and an imaging element, such as a charge-coupled device (CCD), and captures an image (moving image here). The first imaging unit 17 has a particularly wide-angle lens (such as a fish-eye lens), and images the front area in front of the image forming apparatus 10 at an angle wider than a standard imaging lens. The second imaging unit 18 is arranged to be next to the display 14 in the direction of width of the image forming apparatus 10. The second imaging unit 18 is located at a position that allows the face of a user to be imaged. This is intended to allow the second imaging unit 18 to authenticate the face of the user using the captured image.

The power source controller 19 is electrically connected to a power source, such as a commercial power source (not illustrated here), and controls power supplying from the power source to each element of the image forming apparatus 10. For example, when the controller 11 sets the image forming apparatus 10 to a mode, the power source controller 19 controls the power supplying to each element of the image forming apparatus 10 in accordance with the set mode.

A power source line connected to each element of the image forming apparatus 10 is not illustrated in FIG. 2.

The image forming apparatus 10 also includes, besides the elements described above, units of an ordinary image forming apparatus, such as an image reading unit (not illustrated) to read the image of a document or the like, and a communication unit Cm (denoted by a broken-lined box in FIG. 2) to communicate with an external device. The image forming apparatus 10 further includes a unit that performs information processing in conjunction with a peripheral device 20, for example, includes a connection unit to be connected to the peripheral device 20 (such as a post-processing device) to be described below. The peripheral device 20 is not particularly limited to any specific structure. The peripheral device 20 in one example is a large-capacity sheet container device that stores sheets to be supplied to the image forming apparatus 10 or sheets discharged from the image forming apparatus 10.

An example of the information processing of the image forming apparatus 10 is described below. When the copy process is performed, the controller 11 generates image data by causing the image reading unit to read the image of a document, and causes the image forming unit 15 to form the image on a sheet in accordance with the image data. When the scan process is performed, the controller 11 generates image data by causing the image reading unit to read the image of a document, and stores the image data on the memory 13 or transmits the image data via a network. When the facsimile transmission process is performed, the controller 11 generates image data by causing the image reading unit to read the image of a document, and transmits the image data in a facsimile transmission via a telephone line (not illustrated).

Figure 3:
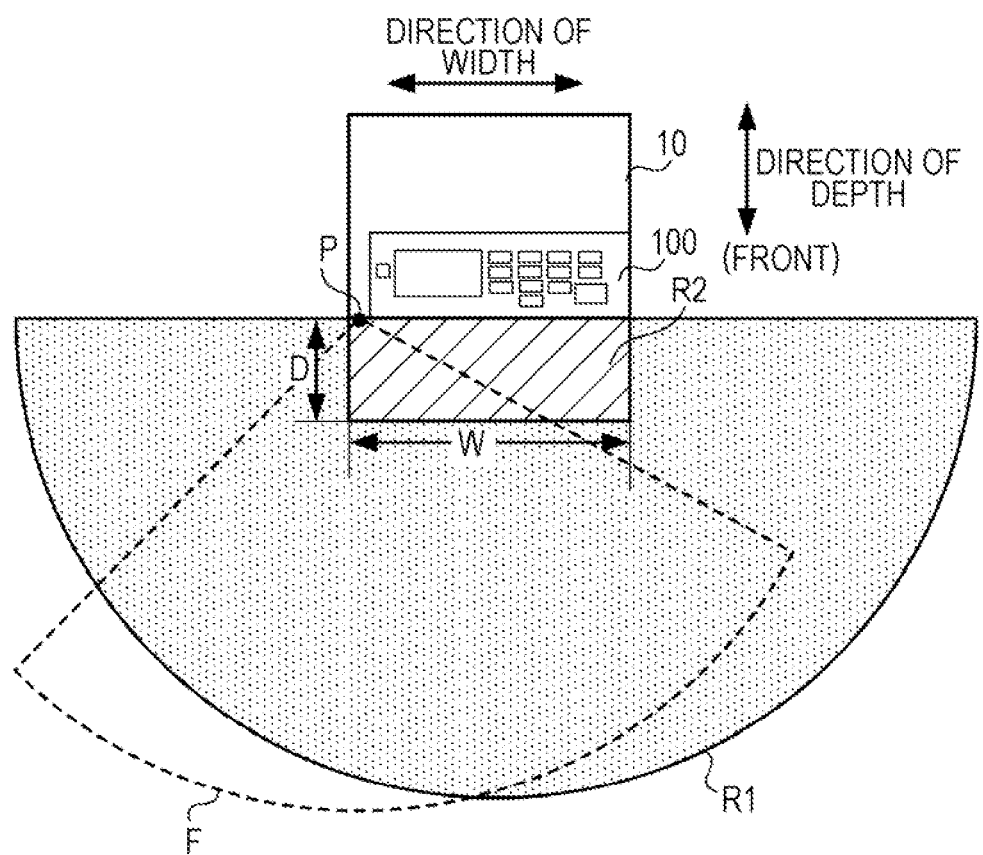
FIG. 3 illustrates an area where the presence of a person is sensed by the image forming apparatus.

FIG. 3 illustrates an area where the presence of a person is sensed by the image forming apparatus 10. FIG. 3 is a plan view of the image forming apparatus 10 and the surrounding area thereof that are viewed from above the image forming apparatus 10 in the direction of height of the image forming apparatus 10.

As illustrated in FIG. 3, the sensing area F of the pyroelectric sensor 16 is formed in front of the image forming apparatus 10 and has a generally sector shape in a plan view if viewed from above in the direction of height. If a person who is going to use the image forming apparatus 10 approaches the image forming apparatus 10, the person first enters the sensing area F.

An approach sensing area R1 of FIG. 3 is formed in front of the image forming apparatus 10 and has a generally sector shape in a plan view if viewed from above in the direction of height. The approach sensing area R1 is set up to generally include the sensing area F. The person who approaches the image forming apparatus 10 enters the approach sensing area R1. The approach sensing area R1 corresponds to an area of a "first distance" from the image forming apparatus 10. A location labeled "P" in FIG. 3 where the first imaging unit 17 is arranged is referred to as the location of the image forming apparatus 10. Note that the area of the first distance is an area determined by the first distance. The internal area determined by the first distance is referred to as "within the first distance".

The approach sensing area R1 is a sector having a central angle of 180 degrees (semi-circle), but the central angle may be an angle other than 180 degrees. The first imaging unit 17 is set up so that the first imaging unit 17 has at least the entire approach sensing area R1 as an imaging area.

A standstill sensing area R2 is formed in front of the image forming apparatus 10 and has a rectangular shape in a plan view if viewed from above in the direction of height. The rectangular area has a length W in the direction of width of the image forming apparatus 10 and a length D in the direction of depth of the image forming apparatus 10. The length W in the direction of width of the standstill sensing area R2 is approximately equal to the length of the image forming apparatus 10 in the direction of width thereof. The standstill sensing area R2 corresponds to an area of a "second distance" from the image forming apparatus 10, and is closer to the image forming apparatus 10 than the approach sensing area R1. For this reason, the entire standstill sensing area R2 is set up to be enclosed in the approach sensing area R1. The user of the image forming apparatus 10 enters the standstill sensing area R2, and then stays within the standstill sensing area R2 to perform an operation using the operation panel 100. The area of the second distance is intended to mean an area determined by the second distance. In the following discussion, the inner area of the area of the second distance is also referred to as "within the second distance".

The controller 11 senses a person within each of the approach sensing area R1 and the standstill sensing area R2 by analyzing the image captured by the first imaging unit 17. There is more detail on this below. The approach sensing area R1 and the standstill sensing area R2 are not necessarily set up at a precision level exactly as illustrated FIG. 3, and it is sufficient enough if the approach sensing area R1 and the standstill sensing area R2 are set up at a precision level as high as the level estimated from the captured image of the first imaging unit 17.

Figure 4:
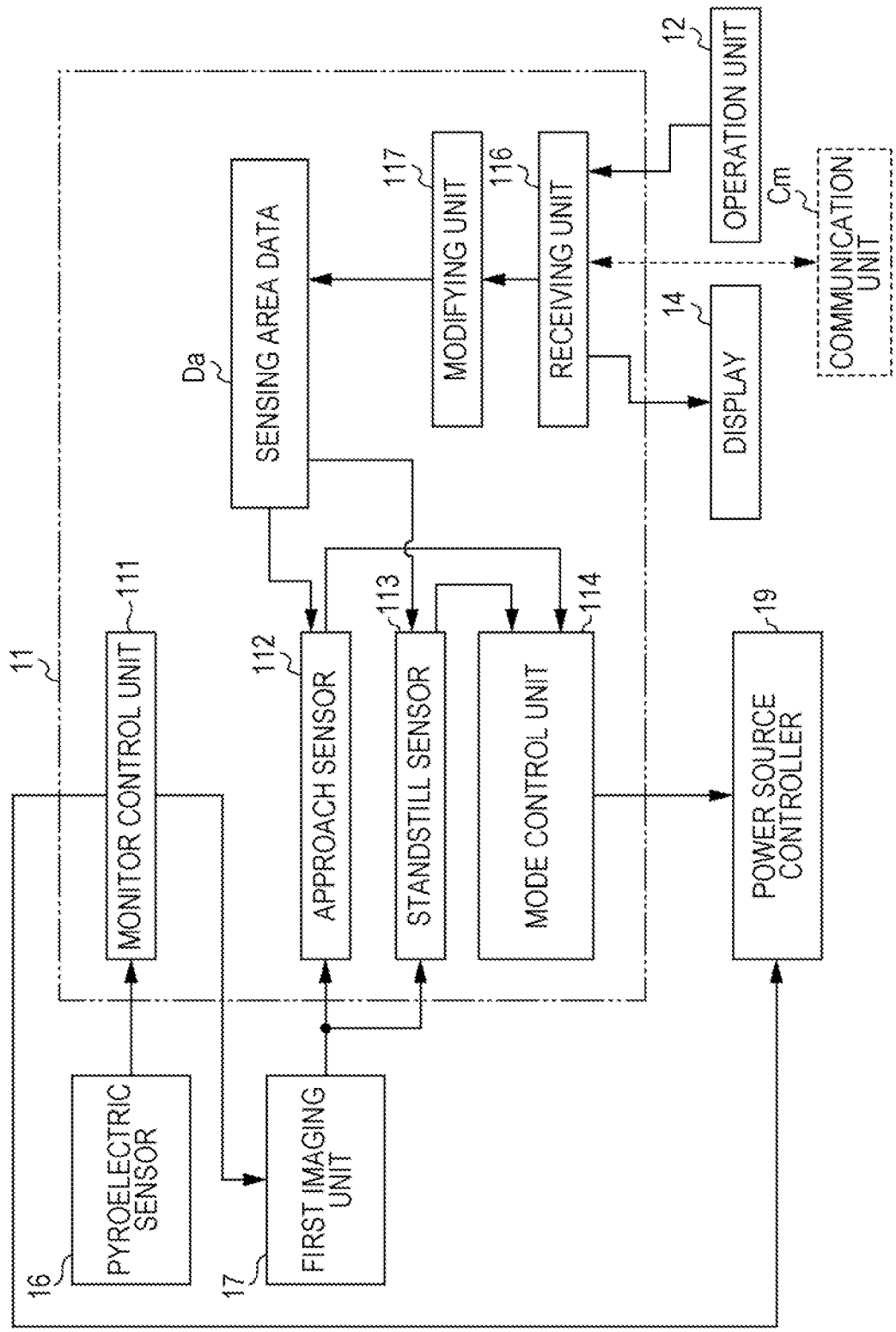
FIG. 4 is a functional block diagram illustrating the image forming apparatus.

FIG. 4 is a functional block diagram illustrating the controller 11 in the image forming apparatus 10. As illustrated in FIG. 4, the controller 11 performs functions corresponding to monitor control unit 111, approach sensor 112, presence sensor 113, mode control unit 114, receiving unit 116 and modifying unit 117. The controller 11 stores sensing area data Da as data representing the approach sensing area R1 (the area of the first distance) and the standstill sensing area R2 (the area of the second distance).

The monitor control unit 111 controls the first imaging unit 17 by monitoring a quantity of infrared light from the pyroelectric sensor 16 while the image forming apparatus 10 operates in the sleep mode. More specifically, upon sensing the presence of a person within the sensing area F in response to the sensing result of the infrared light of the pyroelectric sensor 16, the monitor control unit 111 starts up the first imaging unit 17 to start imaging. In this case, the monitor control unit 111 instructs the power source controller 19 to start supplying power to the first imaging unit 17.

The approach sensor 112 is an example of "a first sensor unit that senses a person within a first distance from the information processing apparatus", and senses the approach of a person within the approach sensing area R1. The approach sensor 112 reads data indicating the approach sensing area R1 from the sensing area data Da.

The approach sensor 112 obtains the captured image of the approach sensing area R1 from the first imaging unit 17, and senses the approach of the person to the image forming apparatus 10 in accordance with the captured image. For example, the approach sensor 112 analyzes the captured image, and detects the distance from the image forming apparatus 10 to the person and the movement of the person. The approach sensor 112 thus senses the approach of the person within the approach sensing area R1.

In the exemplary embodiment, "the first sensor unit that senses a person within the first distance from the information processing apparatus" may be an exemplary structure that senses the approach of the person to the information processing apparatus 10. However, this is an example only. "The first sensor unit that senses a person within the first distance from the information processing apparatus" may include an exemplary structure that senses the presence or absence of a person, namely, simply senses a person within a predetermined distance. Further "the first sensor unit that senses a person within the first distance from the information processing apparatus" may include an exemplary structure that senses a person who seems to use the image forming apparatus 10, namely, senses a person who is present within the predetermined distance and looks at the image forming apparatus 10.

The presence sensor 113 is an example of "a second sensor unit that senses a person within a second distance set closer to the information processing apparatus than the first distance" and herein senses the presence of a person within the standstill sensing area R2. The presence sensor 113 senses the presence of a person within the standstill sensing area R2. The presence sensor 113 reads, from the sensing area data Da, data indicating the approach sensing area R1 and data indicating the standstill sensing area R2. The presence sensor 113 obtains the captured image of the approach sensing area R1 from the first imaging unit 17, and senses the presence of the person within the standstill sensing area R2 in accordance with the captured image. For example, the presence sensor 113 senses the presence of the person within the standstill sensing area R2 by analyzing the captured image, and detecting the distance from the image forming apparatus 10 to the person and the location of the person.

The mode control unit 114 controls the mode in which the image forming apparatus 10 operates. When another mode is set in the image forming apparatus 10, the mode control unit 114 instructs the power source controller 19 to supply power in response to the set mode and performs a control operation to start up or suspend the operation of each unit of the image forming apparatus 10. For example, if the approach sensor 112 has sensed the approach of a person with the image forming apparatus 10 in the sleep mode, the mode control unit 114 shifts the image forming apparatus 10 from the sleep mode to the standard mode. When the presence sensor 113 senses the presence of the person, the mode control unit 114 sets the image forming apparatus 10 to be in the standard mode. When the presence sensor 113 no longer senses the presence of the person, the mode control unit 114 shifts the image forming apparatus 10 to the sleep mode.

The mode control unit 114 may set the image forming apparatus 10 to the mode in response to another trigger. For example, upon receiving an operation to shift to the sleep mode from the operation unit 12, the mode control unit 114 shifts the image forming apparatus 10 to the sleep mode.

The receiving unit 116 receives an instruction to modify the approach sensing area R1 or the standstill sensing area R2. As illustrated in FIG. 4, the receiving unit 116 causes the display 14 to display a menu screen (hereinafter referred to as an area modification menu) thereon. The area modification menu receives the instruction to modify the area. The receiving unit 116 then receives a signal indicating the operation the user has performed on the area modification menu using the operation unit 12. The receiving unit 116 thus receives the user's instruction to modify the approach sensing area R1 and the standstill sensing area R2. The receiving unit 116 may receive from the communication unit Cm denoted by a broken line in FIG. 4 the user's instruction to modify the approach sensing area R1 or the standstill sensing area R2. In such a case, the user may operate a terminal connected to the image forming apparatus 10 via the communication unit Cm. The receiving unit 116 may also receive the user's instruction to modify the approach sensing area R1 or the standstill sensing area R2 in accordance with a schedule table pre-stored on the terminal.

The modifying unit 117 modifies the approach sensing area R1 or the standstill sensing area R2 by rewriting the contents of the sensing area data Da in response to the instruction received by the receiving unit 116.

As described above, the controller 11 functions as a power control device that controls power to the image forming apparatus 10.

The hardware and functional configurations of the image forming apparatus 10 have been described. The image forming apparatus 10 may include a human sensor mounted on a module. The pyroelectric sensor 16, the first imaging unit 17 and the second imaging unit 18 are mounted on the module that implements the functions of the approach sensor 112, the presence sensor 113, the receiving unit 116, and the modifying unit 117. In such a case, the controller 11 controls the human sensor, and performs a control process responsive to sensing results of the human sensor as to the approach and the presence of a person.

Figure 5:
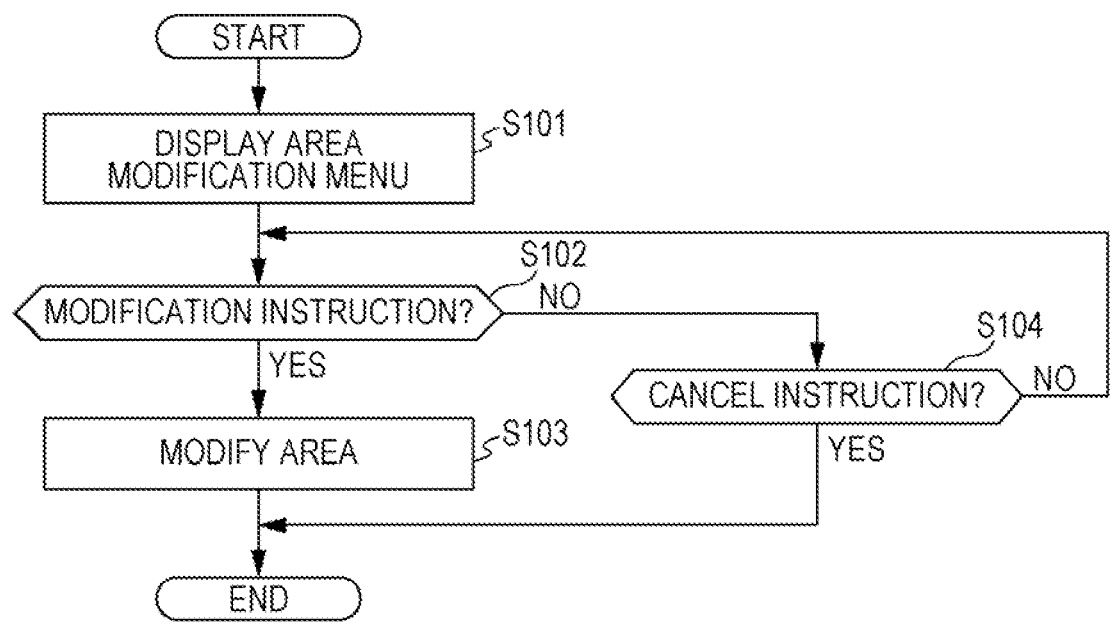
FIG. 5 is a flowchart illustrating a process to modify sensing area data performed by the image forming apparatus.
Figure 6A:
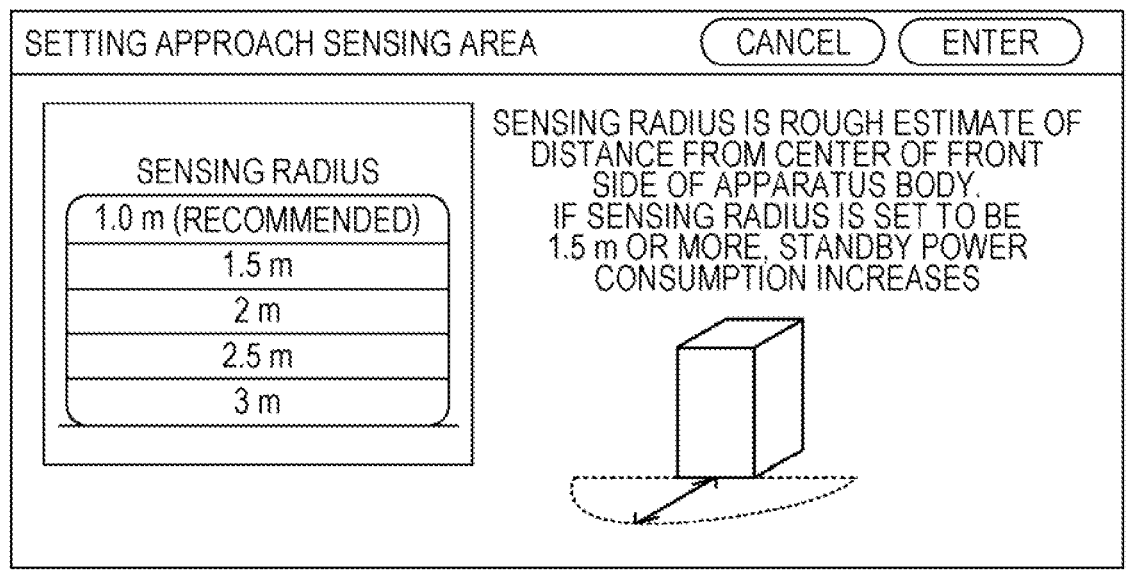
FIG. 6A and FIG. 6B illustrate an example of an area modification menu displayed on the image forming apparatus.
Figure 6B:
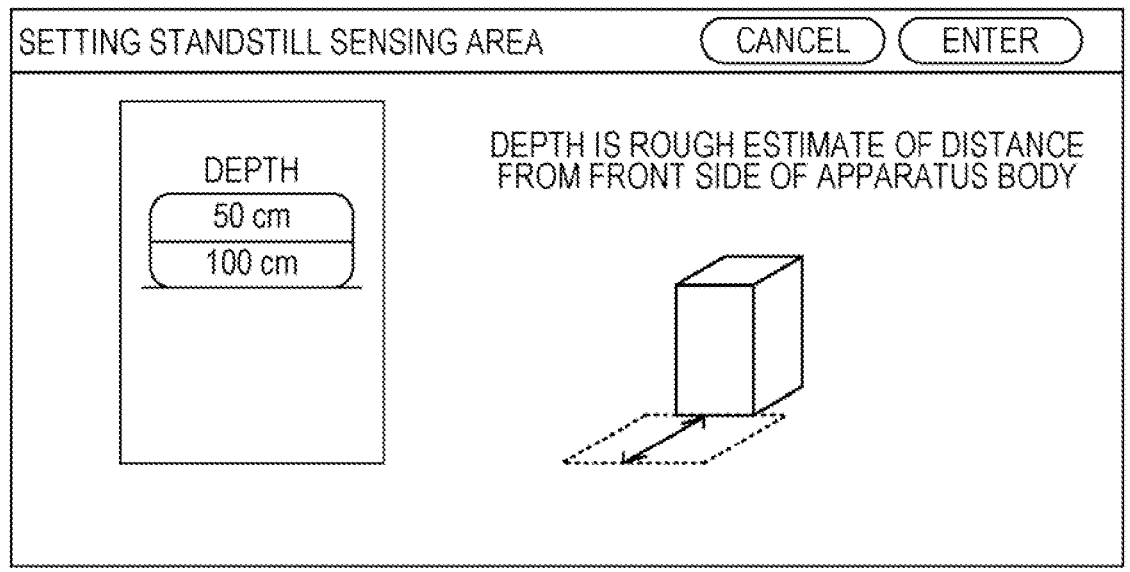

FIG. 5 is a flowchart illustrating the process of modifying the sensing area data Da executed on the image forming apparatus 10. FIGS. 6A and 6B illustrate an example of an area modification menu displayed on the image forming apparatus 10. The user of the image forming apparatus 10 may stand in the standstill sensing area R2 and operate the operation unit 12 to select an item to modify the approach sensing area R1 from a standard menu (not illustrated). The controller 11 in the image forming apparatus 10 causes the display 14 the area modification menu of FIG. 6A thereon (step S101). The area modification menu includes, as buttons, multiple candidates of "sensing radiuses" determining the approach sensing area R1 and text and a rough sketch describing the sensing radius.

The controller 11 in the image forming apparatus 10 determines whether the user has issued a modification instruction or not (step S102). Upon determining that the user has issued the modification instruction (yes branch from step S102), the controller 11 modifies the sensing area data Da in response to the modification instruction. For example, the user may click on a button indicating a sensing radius in the area modification menu, and then click on an enter button. The controller 11 in the image forming apparatus 10 writes the sensing radius indicated by the clicked button to complete the process. In this way, the approach sensing area R1 is modified.

If the controller 11 determines that the user has not issued the modification instruction (no branch from step S102), the controller 11 determines whether the user has issued a cancel instruction (step S104). If the cancel button in the upper portion of the area modification menu as illustrated in FIG. 6A is clicked on, the controller 11 determines that the user has issued the cancel instruction. If the controller 11 determines that the user has issued the cancel instruction (yes branch from step S102), the controller 11 completes the process. The display 14 then reverts back to the standard menu.

Upon determining that the user has not issued the cancel instruction (no branch from step S102), the controller 11 returns to step S102. Through this process, the sensing area data Da is modified in response to the modification instruction of the user.

The user may select on the start menu an item to modify the standstill sensing area R2 by operating the operation unit 12. The controller 11 in the image forming apparatus 10 causes the display 14 to display the area modification menu of FIG. 6B. The area modification menu includes buttons indicating "depth" candidates determining the standstill sensing area R2, and text and a rough sketch describing the depth.

FIG. 7 is a flowchart illustrating a process to control the mode of the image forming apparatus 10. FIGS. 8A, 8B, 8C, 9A, 9B and 9C illustrate examples of the change of the location of a person with time nearby the image forming apparatus 10. As FIG. 3, FIGS. 8A, 8B, 8C and 9A, 9B and 9C and, as described below, FIGS. 11A, 11B and 11C and FIGS. 12A and 12B illustrate plan views of the image forming apparatus 10 and the surround area thereof viewed from above the image forming apparatus 10 in the direction of height of the image forming apparatus 10. The operation of the image forming apparatus 10 is described below with the standstill sensing area R2 set up as illustrated in FIG. 3, in other words, with the peripheral device 20 not connected to the image forming apparatus 10.

Figure 8A:
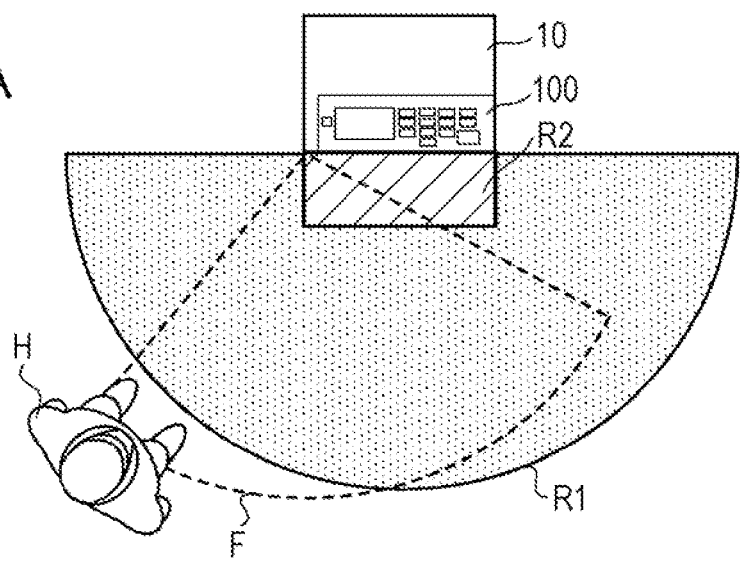
FIG. 8A, FIG. 8B and FIG. 8C illustrate an example of the change of the location of a person nearby the image forming apparatus with time.

With the image forming apparatus 10 operating in the sleep mode, the controller 11 monitors the sensing results of the quantity of infrared light with the pyroelectric sensor 16, and determines whether a person is present within the sensing area F. When a person H enters the sensing area F as illustrated in FIG. 8A, the controller 11 senses the presence of the person within the sensing area F in response to the sensing results of the pyroelectric sensor 16 (step S1).

If the presence of the person is sensed within the sensing area F, the controller 11 instructs the power source controller 19 to start the power supplying to the first imaging unit 17 and reads, from the sensing area data Da, data indicating the approach sensing area R1. The controller 11 starts the first imaging unit 17 to begin imaging the approach sensing area R1 (step S2). The controller 11 is an example of a device controller that causes the first imaging unit 17 to operate when the pyroelectric sensor 16 (third sensor unit) senses the presence of a person. When the first imaging unit 17 starts imaging, the controller 11 analyzes the image obtained from the first imaging unit 17, and then starts detecting the movement of the person by analyzing the image obtained from the first imaging unit 17 (step S3).

In the operation of detecting the movement of the person in step S3, the controller 11 estimates the distance from the image forming apparatus 10 to the person while calculating a motion vector indicating the movement of the person. The operation of detecting the movement of the person may be a related art technique. For example, the controller 11 estimates the distance from the image forming apparatus 10 to the person based on the magnitude of a part of the body of the person detected from the captured image. The controller 11 also compares sequentially multiple frames of the captured images by performing a framing operation on the captured images from the first imaging unit 17. In this case, the controller 11 detects the toe as the part of the body of the person, and calculates the motion vector by analyzing the movement of the detected part. For example, the controller 11 corrects the captured image from the first imaging unit 17 (into a plan view form), and then detects the movement of the person.

Figure 8B:
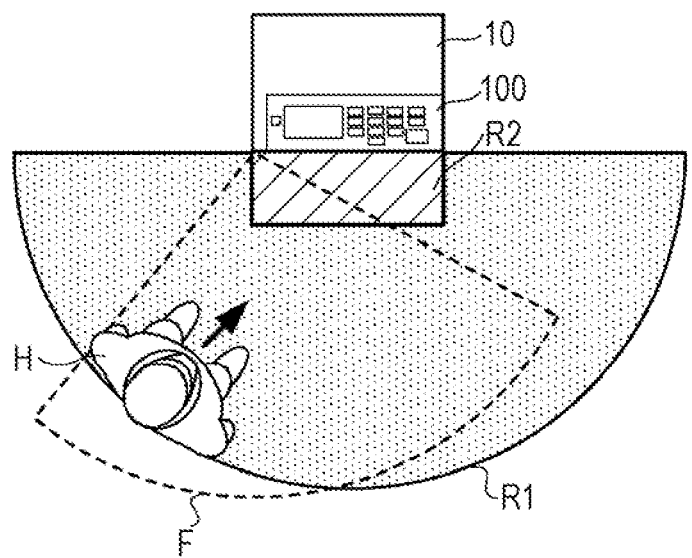

The controller 11 determines whether the approach of the person is sensed within the approach sensing area R1 (step S4). As illustrated in FIG. 8B, the controller 11 may determine that the person H is within the approach sensing area R1, and that the person H moves toward the image forming apparatus 10 (as denoted by an arrow in FIG. 8B). The controller 11 then determines that the approach of the person has been sensed (yes branch from step S4).

Note that during the period throughout which the pyroelectric sensor 16 senses the presence of the person, the controller 11 performs the operation to detect the movement of the person, and repeats the operation in step S4 to determine whether the person approaches (no branch from step S4).

In the yes branch from step S4, the controller 11 shifts the image forming apparatus 10 from the sleep mode to the standard mode (step S5). The controller 11 instructs the power source controller 19 to perform the power supplying to each unit of the image forming apparatus 10 in response to the standard mode and starts up each unit of the image forming apparatus 10.

The controller 11 does not shift the image forming apparatus 10 to the standard mode immediately when the presence of a person has been sensed within the approach sensing area R1 but shifts the image forming apparatus 10 to the standard mode when the approach of the person to the image forming apparatus 10 has been sensed. This reduces the possibility that the image forming apparatus 10 is shifted to the standard mode only when the person H simply passes through the approach sensing area R1.

The controller 11 reads, from the sensing area data Da, data indicating the standstill sensing area R2, and starts an operation to sense the presence (i.e., standstill) of the person within the standstill sensing area R2 (step S6). The controller 11 detects a part of the body of the person by analyzing the captured image from the first imaging unit 17, and senses the presence of the person within the standstill sensing area R2 in accordance with the location and the size of the detected part. For example, the controller 11 estimates the distance from the image forming apparatus 10 to the person in response to the size of the detected part of the body, and identifies a direction to the location of the person based on the location of the detected part of the body.

Figure 8C:
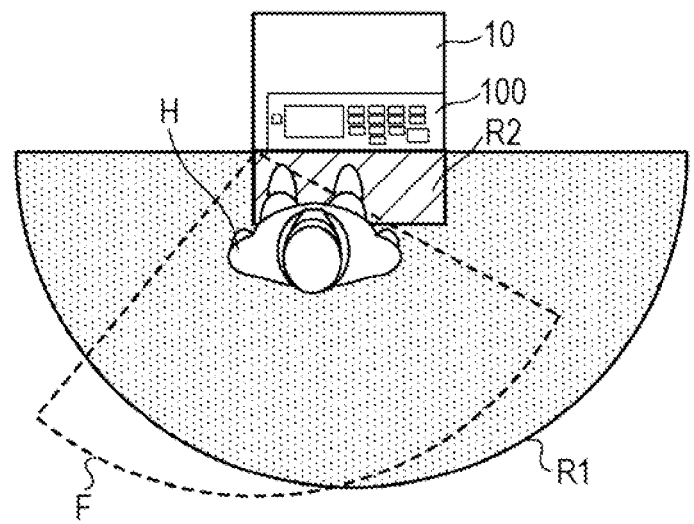

The controller 11 determines whether the person is present within the standstill sensing area R2 (step S7). If the controller 11 determines with the person H at the location as illustrated in FIG. 8C that the person is present within the standstill sensing area R2 (yes from step S7), processing returns to step S6. The controller 11 repeats the operation to sense the presence of the person within the standstill sensing area R2 with the image forming apparatus 10 set in the standard mode until the presence of the person is no longer sensed within the standstill sensing area R2.

Figure 9A:
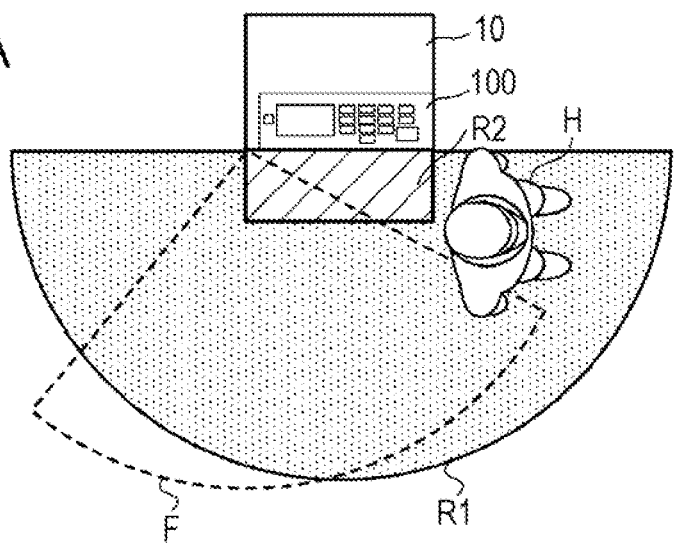
FIG. 9A, FIG. 9B and FIG. 9C illustrate an example of the change of the location of the person nearby the image forming apparatus with time.

As illustrated in FIG. 9A, the person H may move out of the standstill sensing area R2 possibly because of the completion of the job with the image forming apparatus 10. In such a case, the controller 11 determines that the person is no longer present within the standstill sensing area R2 (no branch from step S7), and proceeds to step 8. The controller 11 starts to measure time with the timer T (step S8). In other words, using the timer T, the controller 11 measures elapsed time from when the person is no longer present within the standstill sensing area R2.

Figure 9B:
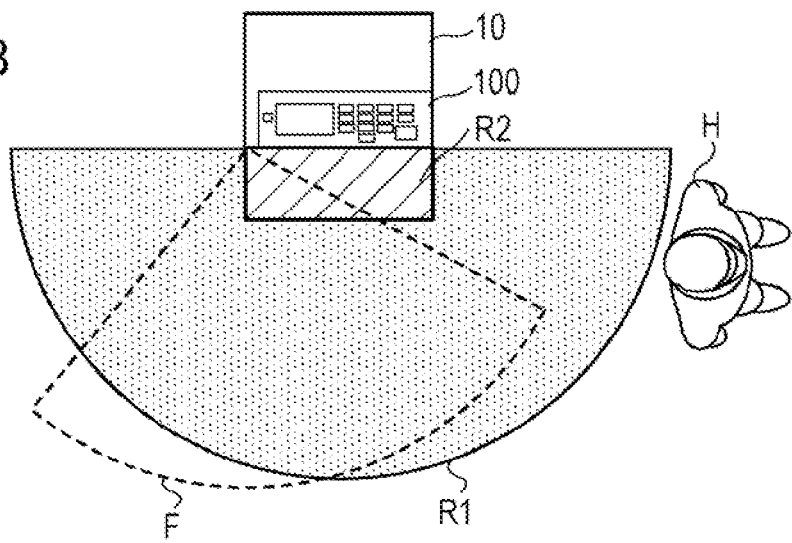

The controller 11 determines whether a person is present with the standstill sensing area R2 (step S9). In the operation of step S9, the controller 11 determines whether the presence of the person is sensed again once the person has been no longer present within the standstill sensing area R2. As illustrated in FIG. 9B, the person H may gradually go away from the image forming apparatus 10 and no person may be present within the standstill sensing area R2. The controller 11 then determines that the answer to the operation in step S9 is "no" (no branch from step S9), and proceeds to step S10.

The controller 11 determines whether the time set in the timer T has elapsed (step S10). The set time may be 1 minute, for example. Time different from 1 minute may also be set. If the controller 11 determines that the set time has not elapsed (no branch from step S10), processing returns to step S9. More specifically, the controller 11 determines in each of the steps S9 and S10 whether the period throughout which no person is present within the standstill sensing area R2 is equal to the set time.

Upon determining in step S10 that the set time of the timer T has elapsed since the start of the time measurement of the timer T (yes branch from step S10), the controller 11 shifts the image forming apparatus 10 from the standard mode to the sleep mode (step S11). In this operation, the controller 11 instructs the power source controller 19 to supply power for the sleep mode to each unit of the image forming apparatus 10 and suspends the operation of each unit in the image forming apparatus 10 that is to be suspended during the sleep mode. When the presence of the person is no longer sensed within the sensing area F, the controller 11 suspends the operation of the first imaging unit 17.

Figure 9C:
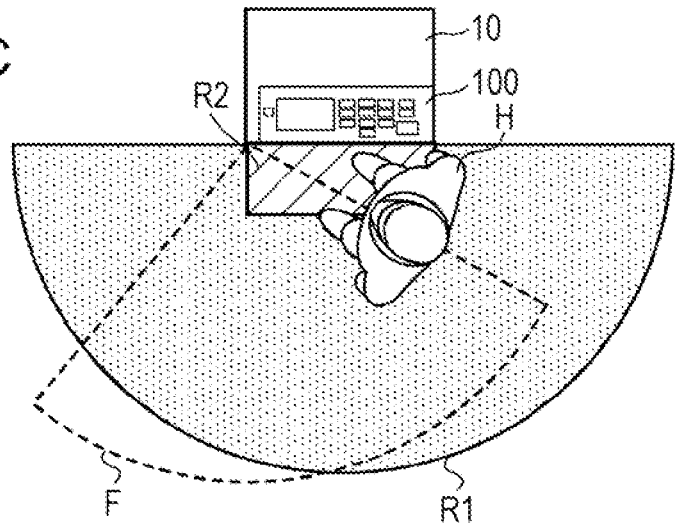

As illustrated in FIG. 9C, the controller 11 may sense the presence of a person again on the elapse of the set time from when the person is no longer present within the standstill sensing area R2 after the start of the time measurement of the timer T. In such a case, the controller 11 determines that the answer to the operation in step S9 is "yes" (yes branch from step S9), and processing proceeds to step S12. The controller 11 stops the time measurement of the timer and resets the timer T (step S12). The controller 11 stops shifting to the sleep mode initiated by the no-presence of the person within the standstill sensing area R2, and then returns to step S6. In other words, the controller 11 again executes the operation that applies to the case when the person is present within the standstill sensing area R2.

It is assumed herein that the same person, i.e., the person H has returned back. If a different person comes into the standstill sensing area R2, the controller 11 also determines that the answer to step S9 is "yes".

The general flow of the process illustrated in FIG. 7 has been described. An operation of setting the standstill sensing area R2 in response to the peripheral device 20 is described below. The peripheral device 20 may be a device arranged external to the image forming apparatus 10.

If the peripheral device 20 is connected to the image forming apparatus 10, the image forming apparatus 10 and the peripheral device 20 are electrically linked to each other. The controller 11 in the image forming apparatus 10 receives a signal from the peripheral device 20, and thus senses the peripheral device 20 connected thereto. More specifically, the controller 11 in the image forming apparatus 10 functions as a device sensor unit that senses a connection of a device that is used for information processing and arranged external to the image forming apparatus 10. Upon receiving a unique signal from the peripheral device 20, the controller 11 may sense the connection and type (model number) of the peripheral device 20.

When the peripheral device 20 is connected to the image forming apparatus 10, the controller 11 varies the standstill sensing area R2 in response to the connected peripheral device 20 in step S6. Note that the approach sensing area R1 is varied when the user performs an operation using the operation unit 12, but is not varied in response to the connection of the peripheral device 20.

FIG. 10 is a flowchart illustrating a process of setting the standstill sensing area R2 of the image forming apparatus 10. Each of the operations of FIG. 10 is executed prior to the start of the operation to sense the presence of the person within the standstill sensing area R2. FIGS. 11A, 11B and 11C and FIGS. 12A and 12B illustrate setting examples of the standstill sensing area R2.

The controller 11 senses the connection of the peripheral device 20 (step S61). More specifically, the controller 11 detects whether the peripheral device 20 is connected. If the peripheral device 20 is connected, the controller 11 senses the type of the peripheral device 20.

The controller 11 automatically senses the connection of the peripheral device 20 and senses the type of the peripheral device 20 if the peripheral device 20 is connected. Optionally, the controller 11 may senses the connection of the peripheral device 20 based on information manually set by the user.

The controller 11 determines whether the peripheral device 20 is connected (step S62). Upon determining that the peripheral device 20 is not connected (no branch from step S62), the controller 11 does not vary the standstill sensing area R2 (step S63). More specifically, the controller 11 sets up in the sensing area data Da the standstill sensing area R2 having a length of W in the direction of width and a length of D in the direction of depth of the image forming apparatus 10 in a plan view viewed from above the image forming apparatus 10 in the direction of height of the image forming apparatus 10 (see FIG. 3).

On the other hand, upon determining that the peripheral device 20 is connected (yes branch from S62), the controller 11 varies the standstill sensing area R2 written in the sensing area data Da to the standstill sensing area R2 responsive to the type of the connected peripheral device 20 (step S64). The type of the peripheral device 20 is identified by a model number of the peripheral device 20. The type of the peripheral device 20 may also be identified by any other identification thereof. The relationship between the type of the peripheral device 20 and the standstill sensing area R2 is listed in a management table (not illustrated) to be stored on the memory 13. Referring to the management table, the controller 11 sets up the standstill sensing area R2.

In the operation of step S64, the controller 11 varies the standstill sensing area R2 in accordance with the location and the dimensions of the peripheral device 20.

Figure 11A:
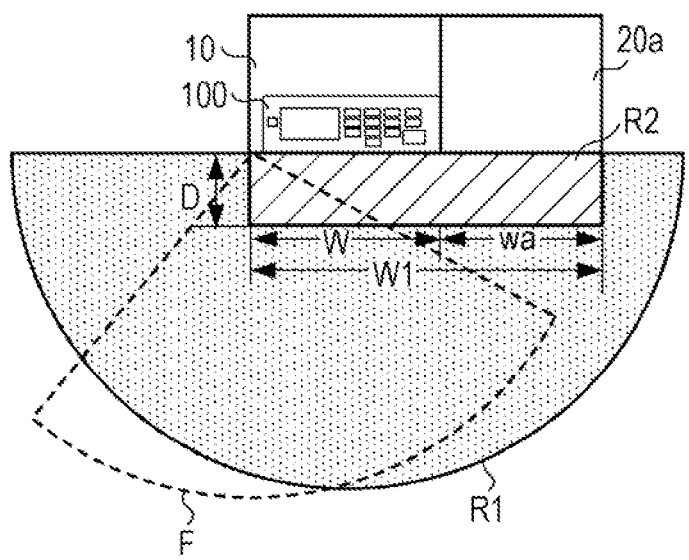
FIG. 11A, FIG. 11B and FIG. 11C illustrate a setting example of the standstill sensing area of the image forming apparatus.

As illustrated in FIG. 11A, a peripheral device 20a may now be mounted next to the right side (if viewed from the user) of the image forming apparatus 10 in the direction of width of the image forming apparatus 10, and the length of the peripheral device 20a in the direction of width may be wa. In such a case, in order to set up the standstill sensing area R2 in front of all the front sides of the image forming apparatus 10 and the peripheral device 20a, the controller 11 sets the sum W1 (=W+wa) of the length W of the image forming apparatus 10 in the direction of width thereof and the length wa of the peripheral device 20a in the direction of width thereof to be the length in the direction of width of the standstill sensing area R2. The controller 11 sets the length in the direction of depth to be D in the same manner as in FIG. 3.

Figure 11B:
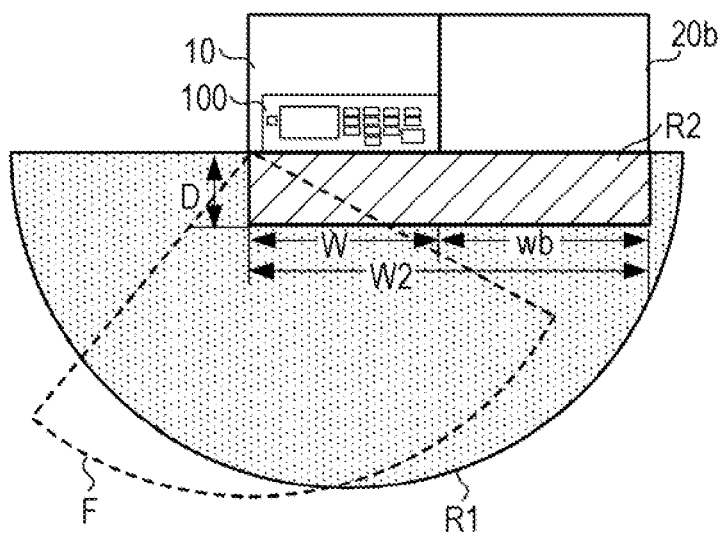

As illustrated in FIG. 11B, a peripheral device 20b may now be mounted next to the right side of the image forming apparatus 10 in the direction of width of the image forming apparatus 10, and the length of the peripheral device 20b in the direction of width may be wb (wb>wa). In such a case, in order to set up the standstill sensing area R2 in front of all the front sides of the image forming apparatus 10 and the peripheral device 20b, the controller 11 sets the sum W2 (=W+wb) of the length W of the image forming apparatus 10 in the direction of width thereof and the length wb of the peripheral device 20b in the direction of width thereof to be the length in the direction of width of the standstill sensing area R2. The controller 11 sets the length in the direction of depth to be D in the same manner as in FIG. 3.

Figure 11C:
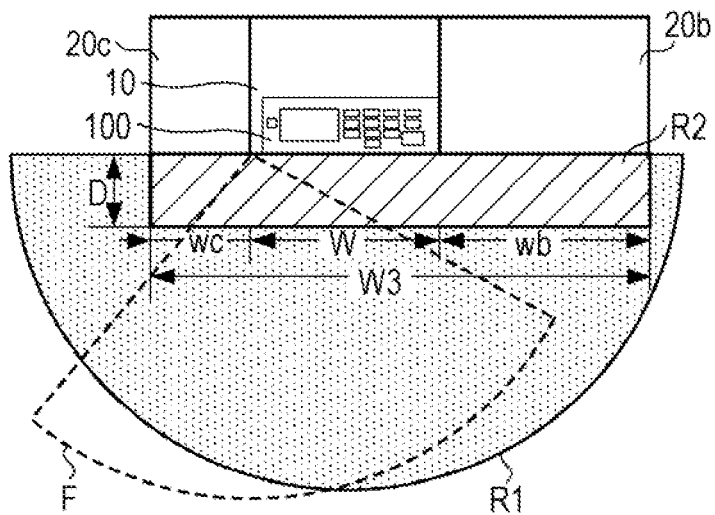

As illustrated in FIG. 11C, in addition to the peripheral device 20b, a peripheral device 20c may now be mounted next to the left side (if viewed from the user) of the image forming apparatus 10 in the direction of width of the image forming apparatus 10, and the length of the peripheral device 20c in the direction of width may be wc. In such a case, in order to set up the standstill sensing area R2 in front of all the front sides of the image forming apparatus 10 and the peripheral devices 20b and 20c, the controller 11 sets the sum W3 (=W+wb+wc) of the length W of the image forming apparatus 10 in the direction of width thereof, the length wb of the peripheral device 20b in the direction of width thereof and the length wc of the peripheral device 20c in the direction of width thereof to be the length in the direction of width of the standstill sensing area R2. The controller 11 sets the length in the direction of depth to be D in the same manner as in FIG. 3.

If the peripheral device 20 is arranged next to the image forming apparatus 10 in the direction of width of the image forming apparatus 10, the user of the image forming apparatus 10 may work not only in front of the image forming apparatus 10 but also in front of the peripheral device 20. In such a case, if the standstill sensing area R2 is set up only in front of the image forming apparatus 10 as illustrated in FIG. 3, the image forming apparatus 10 may be shifted to the sleep mode while the user is still working. If the standstill sensing area R2 is varied in response to the connected peripheral device 20, the controller 11 senses the user working in front of the peripheral device 20 staying within the standstill sensing area R2. In other words, the standstill sensing area R2 is smaller when the peripheral device 20 is not connected than when the peripheral device 20 is connected.

Figure 12A:
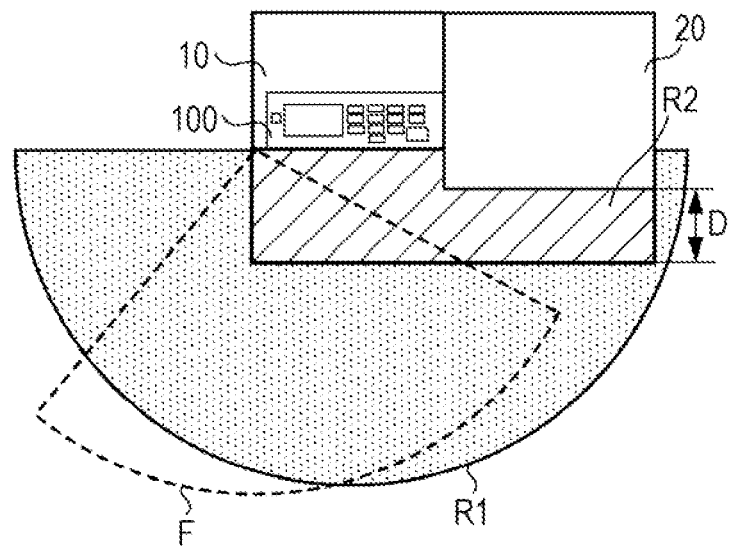
FIG. 12A and FIG. 12B illustrate the setting example of the standstill sensing area of the image forming apparatus.

In the example of FIGS. 11A, 11B and 11C, the controller 11 sets the entire length of the standstill sensing area R2 in the direction of depth to be D. As illustrated in FIG. 12A, the position of the front side of the image forming apparatus 10 and the position of the front side of the peripheral device 20 may be different in the direction of depth. In such a case, the controller 11 may set the standstill sensing area R2 so that the distance D is reserved from one of the front sides whichever is closer to the user. If the front side of the image forming apparatus 10 is closer to the user, the controller 11 sets at least the distance D to be reserved from the front side of the image forming apparatus 10.

If the first imaging unit 17 in the image forming apparatus 10 has as the sensing area thereof not only the front side of the image forming apparatus 10 and the front side of the peripheral device 20 but also the lateral side of the image forming apparatus 10, the controller 11 may set the standstill sensing area R2 on the lateral side of the image forming apparatus 10.

Figure 12B:
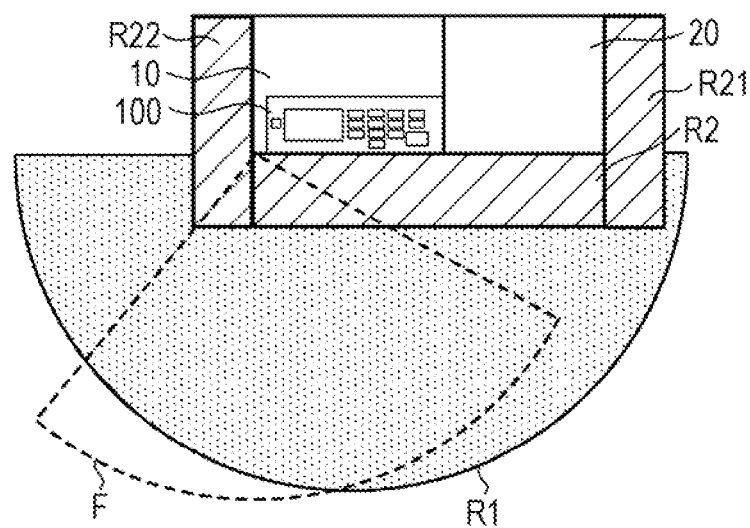

As illustrated in FIG. 12B, the controller 11 may set a standstill sensing area R22 on the lateral side of the image forming apparatus 10 opposite the peripheral device 20. The controller 11 may also set a standstill sensing area R21 on the lateral side of the peripheral device 20 opposite the image forming apparatus 10. With this arrangement, an unwanted shifting of the image forming apparatus 10 to the sleep mode is controlled when the user works on the lateral side of the image forming apparatus 10 or on the lateral side of the peripheral device 20.

When the peripheral device 20 is not connected, the controller 11 may also set the standstill sensing area on the lateral sides of the image forming apparatus 10. The controller 11 may set the standstill sensing area R2 to be longer or shorter in the direction of width instead of setting the standstill sensing area R2 to be approximately equal to the length of the image forming apparatus 10 in the direction of width and the length of the peripheral device 20 in the direction of width.

As described above, the image forming apparatus 10 shifts from the sleep mode to the standard mode upon sensing the approach of a person within the approach sensing area R1. If the person is later no longer present within the standstill sensing area R2 closer to the image forming apparatus 10 than the approach sensing area R1, the image forming apparatus 10 shifts from the standard mode to the sleep mode. The image forming apparatus 10 shifts to the sleep mode more quickly than in the operation in which the image forming apparatus 10 shifts when the person is no longer present from within the approach sensing area R1. If described in terms of imaging by the first imaging unit 17, the image forming apparatus 10 senses the non-presence of the person from within the standstill sensing area R2 by estimating the distance to the person from the captured image from the first imaging unit 17. The image forming apparatus 10 shifts to the sleep mode more quickly than in the operation in which the image forming apparatus 10 shifts to the sleep mode when the presence of the person is no longer sensed from the captured image. The image forming apparatus 10 thus performs more efficient power saving control by setting the mode in response to the distance therefrom to the person.

Since the image forming apparatus 10 estimates the distance from the image forming apparatus 10 to the person by analyzing the captured image, the image forming apparatus 10 has a simplified structure with an increase in the number of sensors controlled in comparison with the case in which another type of sensor such as a reflective-type distance sensor is used.

The present invention may be implemented in an exemplary embodiment different from the exemplary embodiment described above. Modifications of the exemplary embodiment described below may be combined.

In the exemplary embodiment described above, the image forming apparatus 10 varies the standstill sensing area R2 by sensing the connection of the peripheral device 20 arranged external to the image forming apparatus 10. Alternatively, the image forming apparatus 10 may vary the standstill sensing area R2 by sensing the movement of a device included in the image forming apparatus 10 or connected to the image forming apparatus 10. In this case, the controller 11 in the image forming apparatus 10 functions as a device sensor unit that senses the movement of a device that is used for information processing and arranged external to the image forming apparatus 10.

If the peripheral device 20 is moved, the dimensions of the entire image forming apparatus 10 become different, and an area where the working user moves around may also vary. This type of peripheral device 20 includes a movable user interface device, a manual paper feeding tray, and a discharge tray into which processed sheets are discharged. The peripheral device 20 may also include a device that is movably mounted on the image forming apparatus 10. If the device is moved, the external shape and dimensions of the image forming apparatus 10 also change. Upon detecting the movement of the peripheral device 20, the image forming apparatus 10 sets up the standstill sensing area R2 so that the standstill sensing area R2 includes the front side of the image forming apparatus 10 subsequent to the movement of the device.

The dimensions and shapes of the approach sensing area R1 and the standstill sensing area R2 are illustrated for exemplary purposes only, and different dimensions and shapes may be acceptable.

The image forming apparatus 10 may shift from the sleep mode to the standard mode by interpreting the presence of the person within the approach sensing area R1 as the approach of the person to the image forming apparatus 10.

The image forming apparatus 10 may sense the approach of the person within the approach sensing area R1 by allowing the first imaging unit 17 to continuously operate. In such a case, the image forming apparatus 10 may not include the pyroelectric sensor 16.

The image forming apparatus 10 may include separate image devices, one for sensing the approach of the person in the approach sensing area R1 and the other for sensing the presence of the person within the standstill sensing area R2.

The image forming apparatus 10 may sense the approach of a person within the approach sensing area R1 through a method other than the method that includes using the first imaging unit 17. For example, using multiple distance sensors, the image forming apparatus 10 identifies the location of a person within the approach sensing area R1 and senses the approach of the person in accordance with a change in the identified location with time. The image forming apparatus 10 may sense the presence of a person within the standstill sensing area R2 through a method other than the method that includes using the captured image.

The image forming apparatus 10 may immediately shift to the sleep mode upon sensing the no-presence of the person within the standstill sensing area R2.

The image forming apparatus 10 may vary not only the standstill sensing area R2 but also the approach sensing area R1, with the peripheral device 20 connected. In such a case, the image forming apparatus 10 may set the approach sensing area R1 in concert with a change in the standstill sensing area R2 so that the approach sensing area R1 includes the entire standstill sensing area R2.

The image forming apparatus 10 may not include the second imaging unit 18 if the face authentication of the user is not performed.

The movement of the person may be sensed using a method that does not include calculating the motion vector. The movement of the person may be sensed using any related art method such as a block matching method.

Rather than recognizing a person from a captured image and sensing the movement of the person, the image forming apparatus 10 may sense the movement of the person using a related art technique of extracting a moving object without particularly recognizing the person.

In the exemplary embodiment, the image forming apparatus 10 shifts to the sleep mode when the person is no longer present within the standstill sensing area R2. The mode to which the image forming apparatus 10 shifts may be a mode other than the sleep mode as long as the target mode consumes power less than the standard mode. For example, the image forming apparatus 10 may shift to a mode in which the display operation of the display 14 is stopped to reduce power consumption while the units of the image forming apparatus 10 other than the display 14 are kept operative. The image forming apparatus 10 may operate in another mode different in power consumption from the standard mode and the sleep mode, in addition to the standard mode and the sleep mode.

In the exemplary embodiment, the controller 11 activates the first imaging unit 17 when the pyroelectric sensor 16 (third sensor unit) senses the presence of a person. If the approach sensing area R1 is set to be wider than the sensing area F, the operation of the pyroelectric sensor 16 is suspended and the first imaging unit 17 is kept operative. The first imaging unit 17 remains operative even if the presence of a person is not sensed with the pyroelectric sensor 16 inoperative, in other words, regardless of the sensing of a person by the pyroelectric sensor 16. If the approach sensing area R1 is equal to or wider than the sensing area F, the first imaging unit 17 is activated after the pyroelectric sensor 16 has sensed a person.

If the sensing area F is included in the approach sensing area R1, the operation of the pyroelectric sensor 16 is suspended and the first imaging unit 17 is activated.

In the exemplary embodiment and the modifications thereof, the controller 11 in the image forming apparatus 10 varies the length of the standstill sensing area R2 in the direction of width in response to the connection or movement of the sensed peripheral device 20. Alternatively, the controller 11 in the image forming apparatus 10 may vary the standstill sensing area R2 in the direction of depth. If the standstill sensing area R2 is set up on the lateral sides of the image forming apparatus 10 as illustrated in FIG. 12B, the controller 11 may vary the length of the standstill sensing area R2 in the direction of depth in response to the connection or movement of the peripheral device 20. The direction of width on the front side of the image forming apparatus 10 is along the front side thereof. The direction of depth on the lateral side of the operation unit 12 is along the lateral side of the image forming apparatus 10. The controller 11 in the image forming apparatus 10 simply varies the distance of the standstill sensing area R2 in each of the directions along the image forming apparatus 10 in response to the connection or movement of the sensed image forming apparatus 10. The modifying unit 117 implemented by the controller 11 modifies the distance of the standstill sensing area R2 in a direction away from the image forming apparatus 10 in response to the instruction from the receiving unit 116.

In the exemplary embodiment, the modifying unit 117 modifies the approach sensing area R1 or the standstill sensing area R2 by rewriting the sensing area data Da in response to the instruction received by the receiving unit 116. When data of one of the approach sensing area R1 and the standstill sensing area R2 is modified, the modification may be subject to a limitation by data of the other of the approach sensing area R1 and the standstill sensing area R2. The limitation specifically means that the length of the approach sensing area R1 in the direction of width is not permitted to be shorter than the length of the standstill sensing area R2 in the direction of width or that the length of the standstill sensing area R2 in the direction of width is not permitted to be longer than the length of the approach sensing area R1 in the direction of width. The modifying unit 117 may set the standstill sensing area R2 to be not wider than the approach sensing area R1. The operation of the modifying unit 117 may be controlled by causing the receiving unit 116 not to receive a modification request to set the standstill sensing area R2 to be wider the approach sensing area R1.

In the exemplary embodiment, the image forming apparatus 10 is of a console type. The image forming apparatus 10 may be of a desk-top type. The image forming apparatus 10 may be an apparatus that executes information processing in response to an operation of a user.

The information processing apparatus of the exemplary embodiment may be other than an image forming apparatus having multi functions. For example, the information processing apparatus may be a scanning device, a copying device, or a facsimile device. The information processing apparatus may be a personal computer or a server apparatus.

Each function of the controller 11 in the image forming apparatus 10 may be implemented by one or more hardware circuits, may be implemented by a processing device that executes one or more programs, or may be implemented by a combination thereof.

If the function of the controller 11 is implemented using a program, the program may be supplied in a state recorded on a non-transitory computer readable recording medium. The non-transitory recording media include magnetic recording media (a magnetic tape, a magnetic disk (such as hard disk drive (HDD) or a flexible disk (FD)), an optical recording medium (such as an optical disk), a magneto-optical recording medium, and a semiconductor memory. The program may be distributed via a network. The present invention may also be interpreted as an information processing method or a power control method performed by the computer.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An information processing apparatus, comprising:
 a first sensor unit that senses a person within a first distance from the information processing apparatus;
 a second sensor unit that senses a person within a second distance set closer to the information processing apparatus than the first distance, wherein the first distance defines an approach sensing area and the second distance defines a standstill sensing area;
 an initial sensor unit located at a height lower than the first sensor unit, the initial sensor unit being a different type of sensor than the first sensor unit, the initial sensor unit senses a person in an initial sensing area, wherein the approach sensing area generally includes the initial sensing area, but is not entirely overlapping with the initial sensing area, and wherein the first sensor unit is activated when a person is sensed within the initial sensing area by the initial sensor unit; and
 a processor configured as:
 a shifting unit that sets the information processing apparatus to a first mode when a person is sensed by the first sensor unit, and shifts the information processing apparatus from the first mode to a second mode that consumes power less than in the first mode when the person is no longer sensed within the second distance by the second sensor unit;
 a receiving unit that receives an instruction to modify the first distance or the second distance; and
 a modifying unit that modifies the first distance or the second distance in response to the instruction received by the receiving unit.

2. The information processing apparatus according to claim 1, wherein the initial sensor unit that senses a person within a third distance from the information processing apparatus,
 wherein the shifting unit causes the first sensor unit to operate after the initial sensor unit has sensed a person if the first distance is set to be smaller than the third distance, and causes the first sensor unit to operate regardless of whether the initial sensor unit has sensed a person since the operation of the initial sensor unit is suspended if the modifying unit has modified the first distance to be larger than the third distance.

3. The information processing apparatus according to claim 1, further comprising a device sensor unit that senses a connection or a movement of a device configured to be used with and configured to be external to the information processing apparatus, wherein the modifying unit modifies the second distance in response to the connection or the movement of the device sensed by the device sensor unit.

4. The information processing apparatus according to claim 2, further comprising a device sensor unit that senses a connection or a movement of a device configured to be used with and configured to be external to the information processing apparatus, wherein the modifying unit modifies the second distance in response to the connection or the movement of the device sensed by the device sensor unit.

5. The information processing apparatus according to claim 3, wherein the modifying unit modifies a distance component, in a direction along a side of the information processing apparatus, of the second distances in response to the connection or the movement of the device sensed by the device sensor unit and modifies a distance component in a direction away from the information processing apparatus of the second distances in response to an instruction of a user.

6. The information processing apparatus according to claim 4, wherein the modifying unit modifies a distance component, in a direction along a side of the information processing apparatus, of the second distances in response to the connection or the movement of the device sensed by the device sensor unit and modifies a distance component in a direction away from the information processing apparatus of the second distances in response to an instruction of a user.

7. The information processing apparatus according to claim 1, wherein the modifying unit modifies the second distance with the second distance maintained to be not longer than the first distance.

8. The information processing apparatus according to claim 2, wherein the modifying unit modifies the second distance with the second distance maintained to be not longer than the first distance.

9. The information processing apparatus according to claim 3, wherein the modifying unit modifies the second distance with the second distance maintained to be not longer than the first distance.

10. The information processing apparatus according to claim 4, wherein the modifying unit modifies the second distance with the second distance maintained to be not longer than the first distance.

11. The information processing apparatus according to claim 5, wherein the modifying unit modifies the second distance with the second distance maintained to be not longer than the first distance.

12. The information processing apparatus according to claim 6, wherein the modifying unit modifies the second distance with the second distance maintained to be not longer than the first distance.

13. An information processing method of an information processing apparatus, comprising:

sensing a person in an initial sensing area using an initial sensor unit;

sensing a person within a first distance from the information processing apparatus in a first sensing operation using a first sensor unit that is a different type of sensor than the initial sensor unit, wherein the initial sensor unit is located at a height lower than the first sensor unit, and the first sensor unit is activated when a person is sensed within the initial sensing area by the initial sensor unit;

sensing a person within a second distance set closer to the information processing apparatus than the first distance in a second sensing operation, wherein the first distance defines an approach sensing area and the second distance defines a standstill sensing area, wherein the approach sensing area generally includes the initial sensing area, but is not entirely overlapping with the initial sensing area;

setting the information processing apparatus to a first mode when a person is sensed in the first sensing operation, and shifts the information processing apparatus from the first mode to a second mode that consumes power less than in the first mode when the person is no longer sensed within the second distance in the second sensing operation;

receiving an instruction to modify the first distance or the second distance; and modifying the first distance or the second distance in response to the received instruction.

14. A non-transitory computer readable medium storing a program causing a computer to execute a process for processing information on an information processing apparatus, the process comprising:

sensing a person in an initial sensing area using an initial sensor unit;

sensing a person within a first distance from the information processing apparatus in a first sensing operation using a first sensor unit that is a different type of sensor than the initial sensor unit, wherein the initial sensor unit is located at a height lower than the first sensor unit, and the first sensor unit is activated when a person is sensed within the initial sensing area by the initial sensor unit;

sensing a person within a second distance set closer to the information processing apparatus than the first distance in a second sensing operation, wherein the first distance defines an approach sensing area and the second distance defines a standstill sensing area, wherein the approach sensing area generally includes the initial sensing area, but is not entirely overlapping with the initial sensing area;

setting the information processing apparatus to a first mode when a person is sensed in the first sensing operation, and shifts the information processing apparatus from the first mode to a second mode that consumes power less than in the first mode when the person is no longer sensed within the second distance in the second sensing operation;

receiving an instruction to modify the first distance or the second distance; and modifying the first distance or the second distance in response to the received instruction.

15. The information processing apparatus according to claim 1, wherein the modifying unit modifies the first or second distance in accordance with a pre-stored schedule table.

* * * * *